United States Patent Office  3,004,043  Patented Oct. 10, 1961

3,004,043
WATER-SOLUBLE VEGETABLE OIL STEROL DERIVATIVES
Max H. Stern, Rochester, N.Y., assignor to Eastman Kodak Company, Rochester, N.Y., a corporation of New Jersey
No Drawing. Filed Oct. 9, 1959, Ser. No. 845,327
7 Claims. (Cl. 260—397.2)

This invention concerns sterol derivatives, and more particularly, water-soluble vegetable oil sterol derivatives.

Vegetable oil sterols are commonly referred to as "phytosterols." Typical phytosterols include sitosterol, stigmasterol and campesterol, sitosterol being the phytosterol occurring in the largest proportions in vegetable oils. Such phytosterols as sitosterol have been employed in the diets of various animals including humans as an agent to lower the cholesterol level in the blood serum. Hypercholesterolemia can be substantially reduced with sterols and with sterol esters of short-chain fatty acids. However, sterol esters of long-chain fatty acids have little or no activity for reducing hypercholesterolemia.

The oral administration of sterols is complicated by their tendency to be unpalatable and nauseating. In addition, sterols are not water-soluble but rather oil-soluble compounds. It would be desirable to have a water-soluble phytosterol compound that could be administered orally in conjunction with various liquid foods such as fruit juices, soups, beverages and the like, as well as in conventional aqueous therapeutic preparations.

It is an object of the invention to provide new phytosterol derivatives.

It is another object of the invention to provide new water-soluble derivatives of normally water-insoluble phytosterol compounds.

It is still another object of this invention to provide water-soluble vegetable oil sterol compositions having substantial activity for reducing cholesterol in blood serum.

It is an additional object of this invention to provide novel phytosterol derivatives having a high molecular weight "tail-piece," and which phytosterol derivatives have substantial activity for reducing hypercholesterolemia.

It is also an object of this invention ot provide novel water-soluble soybean sterol derivatives.

Other objects and advantages will be apparent from the description and claims which follow.

These and other objects of the invention are attained by providing water-soluble polyethylene glycol esters of phytosteryl acid esters of dicarboxylic acids.

The phytosterol derivatives of the invention can be represented by the following general formula:

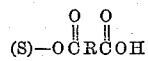

wherein (S) is phytosterol moiety derived from such vegetable oils as soybean oil, corn oil, peanut oil, cottonseed oil etc., wherein R is an alkylene radical having 2 to 6 carbon atoms; and wherein (PEG) is a polyethylene glycol moiety having a molecular weight in the range of 400 to 6000. A typical water-soluble sterol derivative of the invention is a polyethylene glycol ester of sitosteryl acid succinate having the following structure:

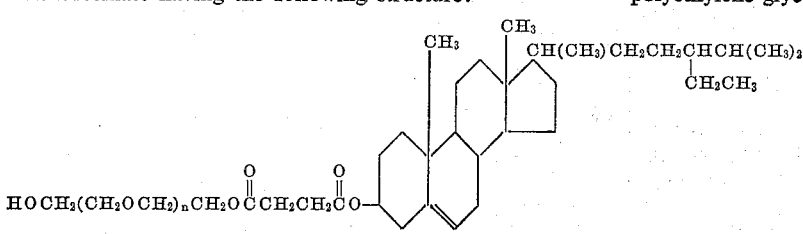

The water-soluble phytosterol derivatives of the invention can be prepared by first preparing a phytosteryl acid ester of a dicarboxylic acid having the formula

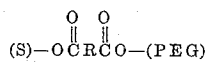

wherein (S) and R are the phytosterol and alkylene substituents described above. The phytosteryl acid ester of a dicarboxylic acid can be prepared by any of the well-known procedures for making acid esters of hydroxylic compounds, a preferred method being to react the phytosterol with a suitable dicarboxylic acid anhydride under usual esterification conditions as illustrated in the specific examples. The dicarboxylic acid moiety of the compounds of the invention can be derived from such acids as succinic acid, glutaric acid, adipic acid, pimelic acid and suberic acid.

The resulting phytosteryl acid esters are then esterified with polyethylene glycol in accordance with well-known esterification techniques. The esterification is effected in an inert organic solvent medium such as toluene, xylene, petroleum ethers, benzene, naphtha or other solvents which do not react or esterify with the reactants. The esterification can be promoted with catalytic amounts of such esterification catalysts as p-toluene sulfonic acid, sulfuric acid, trichloroacetic acid, oxalic acid, hydrochloric acid and the like. The reaction is desirably effected at an elevated temperature such as 60°–150° C. or at reflux temperatures of the solvent with the water formed during the reaction being removed azeotropically during the course of the esterification. The polyethylene glycol employed desirably has a molecular weight of at least 600 to give products having good water solubility, although polyethylene glycols having molecular weights as low as 400 can be employed where lower water solubilities are suitable. Highly water-soluble products are obtained with polyethylene glycols having molecular weights up to about 6000. In order to obtain highly potent phytosterol preparations without too high a percentage of polyethylene glycol moiety, however, the polyethylene glycol desirably has an average molecular weight not substantially higher than about 2000, with polyethylene glycols having average molecular weights in the range of 600 to 1500 being preferred.

Most commercially available polyethylene glycol compositions are mixtures of materials of varying molecular weights and are sold on a basis of the average molecular weight of the composition. Best results in preparing the phytosterol derivatives of the invention are obtained by distilling, solvent extracting or otherwise separating the low molecular weight components of such mixtures from the bulk of the mixture since components below a molecular weight of about 400 lessen the water solubility of the final ester. Thus, for example, it is desirable to distill a polyethylene glycol composition having an average molecular weight of about 1000 to remove as much as 15% by weight of the low boiling components, such distillations being readily effected in high vacuum, short path, centrifugal stills. Alternatively, the commercial polyethylene glycol compositions can be employed directly to esterify phytosteryl acid asters of dicarboxylic acids and the resulting product solvent extracted with petroleum ether or a mixture of solvents such as benzene and petroleum ether, for example, to extract out the less water-soluble components, or the desired product can be crystallized out of a suitable solvent such as ethanol or isopropanol.

The phytosterol derivatives of the invention can be employed to form clear aqueous solutions containing as much as 25% or more by weight of the phytosterol derivative. Such aqueous solutions can be utilized in various therapeutic preparations. For example, the stigmasterol derivatives of the invention are deemed good water-soluble sources of stigmasterol, which sterol is used in the treatment of dermatomyositis as described in Arch. Biochem., 1951, 326. In addition, the phytosterol derivatives of the invention are deemed good water-soluble sources of phytosterols such as sitosterol which is used to reduce hypercholesterolemia or cholesterol in mammal blood serum. This latter property of the phytosterol derivatives of the invention was quite unexpected as several workers in this field have shown that, while phytosterol and phytosterol esters of short-chain fatty acid esters such as the formate ester and the acetate ester were effective in reducing hypercholesterolemia, phytosterol esters with long-chain fatty acids such as the palmitate ester and the oleate ester had very little or substantially none of such activity. However, the water solubilizing "tail-piece" on my active phytosterol derivatives is not a short-chain moiety, but is rather a long-chain, high molecular weight moiety.

The preparation of phytosterol derivatives embodying the invention is illustrated by the following examples of preferred embodiments, it being understood that similar results are obtained by the esterification of any of the phytosterol acid esters of dicarboxylic acids with other polyethylene glycols as described above.

EXAMPLE 1

A solution of 149 g. of mixed soybean sterols (97% sterols by the Liebermann-Burchard reaction consisting essentially of about 70% sitosterol, about 25% stigmasterol and about 5% other phytosterol material including campesterol) in 500 cc. of benzene was dried azeotropically by distilling off 400 cc. of benzene. Then 270 cc. of potassium hydroxide-dried pyridine and 47.5 g. of succinic anhydride were added, a condenser (capped with a calcium chloride drying tube) attached in a reflux position, and the reactants heated on a steam bath for 3 hours. After cooling to 25–30° C., 500 cc. of diethyl ether was added and the reaction mixture stored at 5° C. for 2 hours to precipitate unreacted succinic anhydride. The precipitated succinic anhydride was removed by filtration and the resulting filtrate washed with 5% hydrochloric acid and water to neutrality. After drying over anhydrous sodium sulfate, the solvent was removed by distillation to give 173.6 g. of soybean steryl acid succinate as a light tan solid having a neutralization equivalent of 537 and an infrared spectrum indicating the absence of free hydroxyl groups.

EXAMPLE 2

A 152 g. portion of the soybean steryl acid succinate prepared as described in Example 1, 304 g. of polyethylene glycol having an average molecular weight of about 1000 ("Carbowax 1000"), and 3 liters of toluene were heated to 50° C. in a 5 liter round bottom flask equipped with a stirrer, thermometer, azeotrope tube and calcium chloride drying tubes. Then 1.88 cc. of concentrated sulfuric acid was added to the flask and the contents refluxed for 2 hours with stirring, 7.0 cc. of water being collected in the azeotrope tube. The resulting reaction mixture was cooled to 25–30° C., stirred vigorously for 30 minutes with 30 g. of potassium carbonate, and then 2 more hours with 150 g. of magnesium oxide ("Seasorb 43"). The resulting solution was filtered through a layer of diatomaceous earth ("Celite") and the solvent removed by vacuum distillation. The resulting filtrate was purified by successive extractions with 4 liter portions of petroleum ether (boiling range 40–60° C.) and with 4 liters of a 90/10 petroleum ether/benzene mixture. Each extraction was carried out with vigorous stirring for 25 minute periods. Following each extraction the supernatant phase was decanted and the residual suspension centrifuged to remove excess solvent. The extracted product (324 g.) was dissolved in 2.4 liters of ethanol, crystallized at 5° C., filtered at 5° C. and freed of solvent by evacuation for 16 hours at 5° C. in a desiccator containing calcium chloride. The resulting composition of polyethylene glycol ester of an acid succinate of soybean sterols was found to have the following properties:

(a) Liebermann-Burchard reaction corresponding to 22% soybean sterols, (b) percent unsaponifiable fraction=20.1, (c) Liebermann-Burchard reaction on unsaponifiables= 97.2%, (d) infrared spectrum showed substantially 100% ester, and (e) one part by weight soluble in three to four parts by weight of water at 25° C.

EXAMPLE 3

The water-soluble polyethylene glycol ester of an acid succinate of soybean sterols prepared as described in Example 2 was tested for its hypochloesterolemic effect in rats. The rats were fed ad libitum for 4 weeks on a basal diet with various additives as summarized in the table below. The cholesterol in the blood serum after 4 weeks is also set out in the table below for the rats fed on the various diets.

Table

| Group | Diet | Blood Serum, Total Cholesterol (mg. percent) |
|---|---|---|
| 13 | Basal alone | 220.6 |
| 11 | Basal with 1% cholesterol | 705.2 |
| 22 | Basal with 1% cholesterol and 1% soybean sterols. | 388.5 |
| 28 | Basal with 1% cholesterol and 1%[1] of the prepared soybean sterol derivative. | 377.1 |

[1] Based on the weight of the sterol moiety of the derivative.

It is particularly noteworthy that the present water-soluble soybean sterol derivative, even though it contains a long-chain moiety, is very effective in reducing the cholesterol content in blood serum, such being diametrically opposite in result to the published findings of other workers in the art. The basal diet utilized to feed the rats was composed of approximately 44.7% sucrose, 25% lard, 20% "Vitamin Test" casein, 5% U.S.P. Salt XIV (page 789, 14th Ed. U.S.P.), 4% purified alpha cellulose, 1% cholic acid, 13% choline hydrochloride and small amounts of the fat-soluble and water-soluble vitamins. The vitamin content per 1 kilogram of diet comprised 20 mg. vitamin $B_1$ hydrochloride, 20 mg. vitamin $B_2$, 20 mg. vitamin $B_6$, 60 mg. calcium pantothenate, 100 mg. niacin, 2 g. choline, 1 g. inositol, 10 mg. 2-methyl-1,4-napthoquinone, 200 mg. p-aminobenzoic acid, .4 mg. biotin, 4 mg. folic acid, .04 mg. vitamin $B_{12}$, 40,000 units vitamin A, 4000 units vitamin D and 335 units vitamin E.

EXAMPLE 4

A 2.0 g. portion of soybean steryl acid succinate prepared by the method described in Example 1 and 24 g. of polyethylene glycol having an average molecular weight of about 6000 ("Carbowax 6000") in one liter of toluene in the presence of 0.3 g. of p-toluene sulfonic acid were reacted by the method described in Example 2. The resulting composition of polyethylene glycol ester of an acid succinate of soybean sterols was soluble in water. A clear aqueous solution containing 20% of the resulting soybean sterol derivative can be prepared.

All proportions of components referred to herein are on a weight basis.

The invention thus provides novel water-soluble phytosterol derivatives that are useful in therapeutic preparations.

Although the invention has been described in detail with reference to certain preferred embodiments thereof, it will be understood that variations and modifications can be effected within the spirit and scope of the invention as described hereinabove and as defined in the appended claims.

I claim:

1. A water-soluble polyethylene glycol ester of a phytosteryl acid ester of a dicarboxylic acid having the formula $$(S)-O\overset{O}{\underset{\|}{C}}R\overset{O}{\underset{\|}{C}}O-(PEG)$$

wherein (S) is a phytosterol moiety selected from the group consisting of sitosterol, stigmasterol and campesterol joined to said dicarboxylic acid at the 3-position of the steroid nucleus, R is an alkylene radical having 2 to 6 carbon atoms and (PEG) is a polyethylene glycol moiety having a molecular weight of 400 to 6000.

2. A water-soluble ester as described in claim 1 wherein the phytosterol moiety is sitosterol.

3. A water-soluble ester as described in claim 1 wherein the phyosterol moiety is stigmasterol.

4. A water-soluble ester as described in claim 1 wherein the phytosterol moiety is campesterol.

5. A water-soluble polyethylene glycol ester of a phytosteryl acid ester of succinic acid having the formula $$(S)-O\overset{O}{\underset{\|}{C}}CH_2CH_2\overset{O}{\underset{\|}{C}}O-(PEG)$$

wherein (S) is a phytosterol moiety selected from the group consisting of sitosterol, stigmasterol and campesterol joined to said succinic acid at the 3-position of the steroid nucleus and (PEG) is a polyethylene glycol moiety having a molecular weight of 600 to 1500.

6. A water-soluble polyethylene glycol ester of a phytosteryl acid ester of succinic acid having the formula $$(S)-O\overset{O}{\underset{\|}{C}}CH_2CH_2\overset{O}{\underset{\|}{C}}O-(PEG)$$

wherein (S) is a phytosterol moiety selected from the group consisting of sitosterol, stigmasterol and campesterol joined to said succinic acid at the 3-position of the steroid nucleus and (PEG) is a polyethylene glycol moiety having an average molecular weight of about 1000.

7. A water-soluble polyethylene glycol ester of a phytosteryl acid ester of succinic acid having the formula $$(S)-O\overset{O}{\underset{\|}{C}}CH_2CH_2\overset{O}{\underset{\|}{C}}O-(PEG)$$

wherein (S) is a phytosterol moiety selected from the group consisting of sitosterol, stigmasterol and campesterol joined to said succinic acid at the 3-position of the steroid nucleus and (PEG) is a polyethylene glycol moiety having an average molecular weight of about 6000.

References Cited in the file of this patent

UNITED STATES PATENTS 2,708,651    Laubach _____ May 17, 1955

OTHER REFERENCES

Loynes et al.: Can. J. Med. Sci., vol. 30, pages 325–32 (1952); abstracted in C.A. 47: 1279d.